United States Patent
Hamano et al.

(10) Patent No.: US 6,178,474 B1
(45) Date of Patent: Jan. 23, 2001

(54) MEDIA CONNECT MODULE FOR PORTABLE COMPUTER

(75) Inventors: Takeshi Hamano, San Jose; Samir Sathe, Sunnyvale; Manu Pillai, San Jose; Darren Kim, Oakland; Isamu Yamada, San Jose, all of CA (US)

(73) Assignee: Fujitsu Limited (JP)

( * ) Notice: Under 35 U.S.C. 154(b), the term of this patent shall be extended for 0 days.

(21) Appl. No.: 09/093,526

(22) Filed: Jun. 8, 1998

(51) Int. Cl.[7] .................................................... G06F 13/00
(52) U.S. Cl. .......................... 710/101; 710/62; 710/106; 710/129; 710/2; 439/638; 439/131
(58) Field of Search ................... 710/100, 2, 62, 710/101, 102, 103, 129, 128, 73, 106, 11, 72; 439/638, 502, 629, 131; 361/683

(56) References Cited

U.S. PATENT DOCUMENTS 5,687,387 * 11/1997 Endejan et al. ........................ 710/2
5,736,727 * 4/1998 Nakata et al. ....................... 235/487
5,805,833 * 9/1998 Verdum ............................... 710/101
5,954,827 * 9/1999 Frank et al. ........................... 714/48

* cited by examiner

*Primary Examiner*—Ario Etienne
(74) *Attorney, Agent, or Firm*—Coudert Brothers

(57) ABSTRACT

A module which may be connected to an I/O port of a notebook computer to provide an enhancement to the number of connectivity options available to a user of the computer. The module houses a set of connectors, some or all of which may be specialized ones not normally found on the computer. The connectors are electrically connected to an I/O port of the computer by a flexible cable that allows the module to be easily positioned or re-positioned by the user. The flexibility of the connection allows the user to easily satisfy the line of sight requirement when using the infrared port for data transmission.

41 Claims, 15 Drawing Sheets

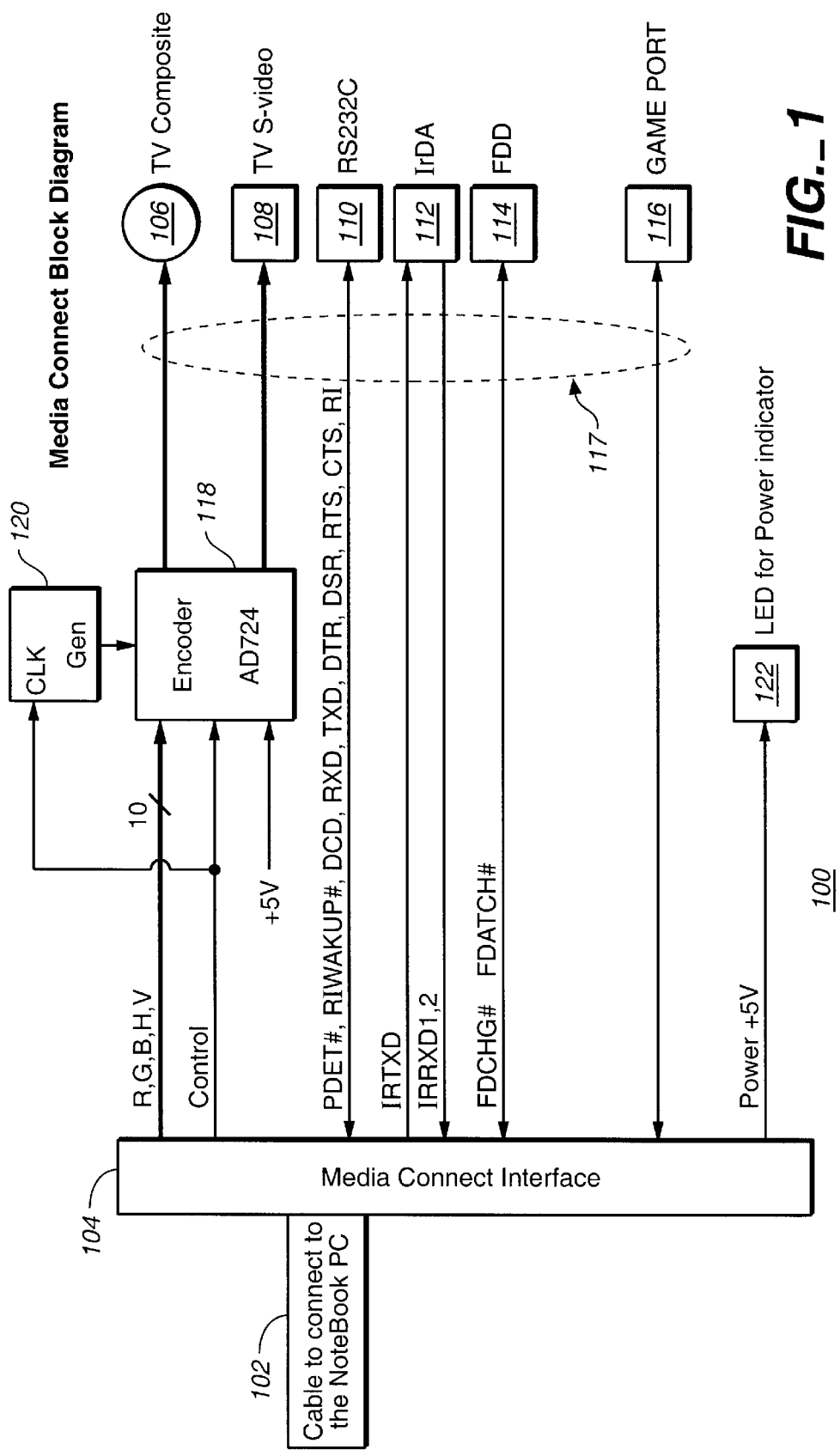
FIG._1

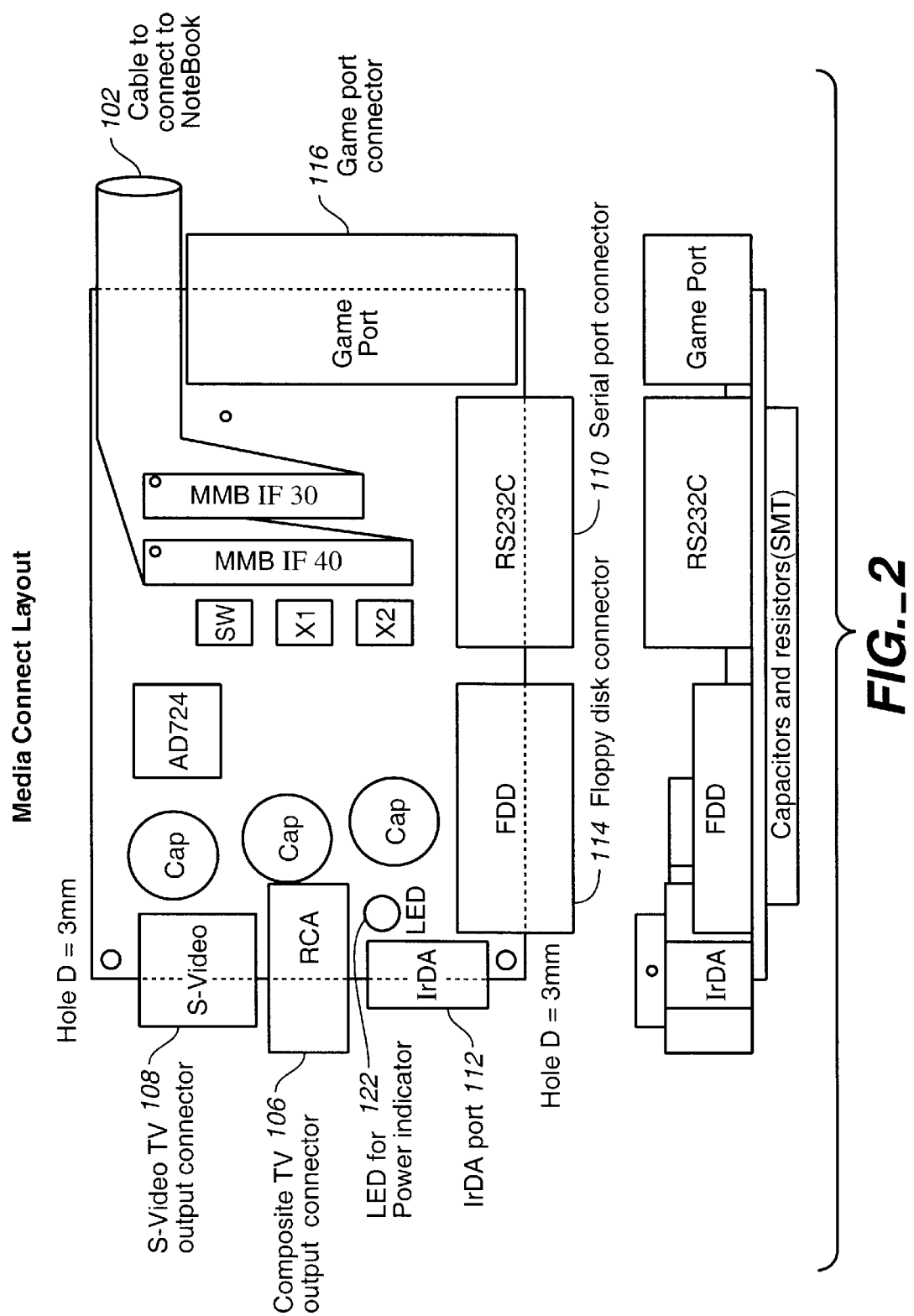
FIG._2

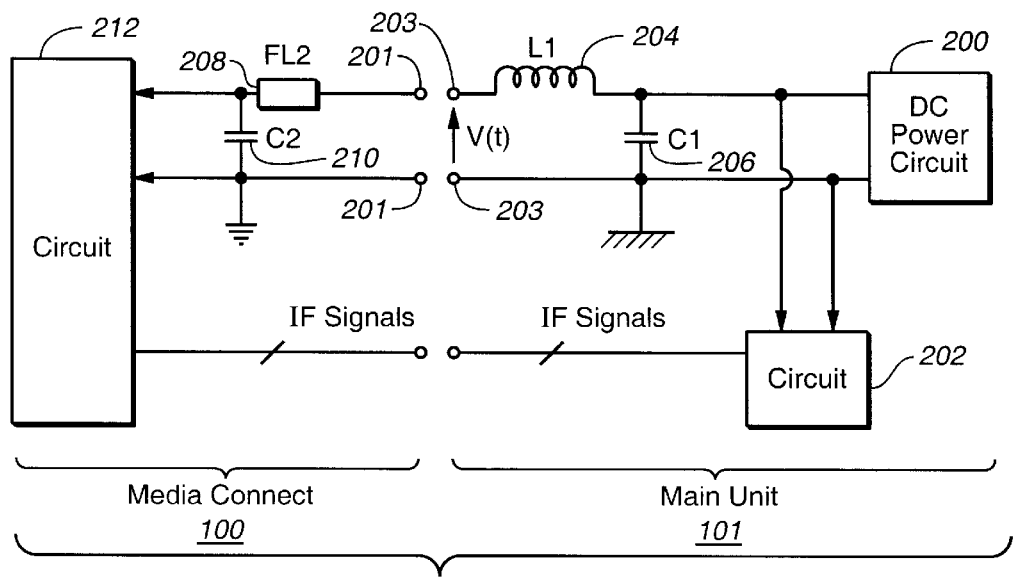
FIG._3
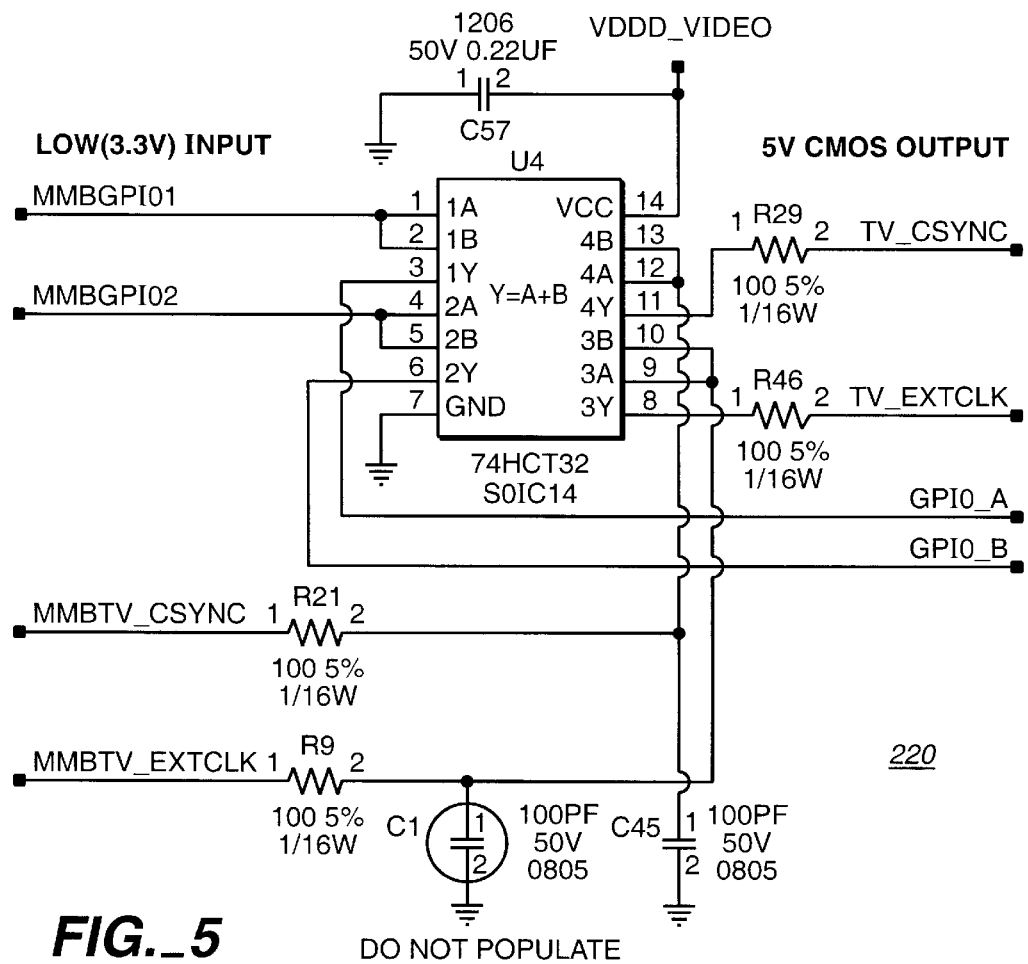
FIG._5

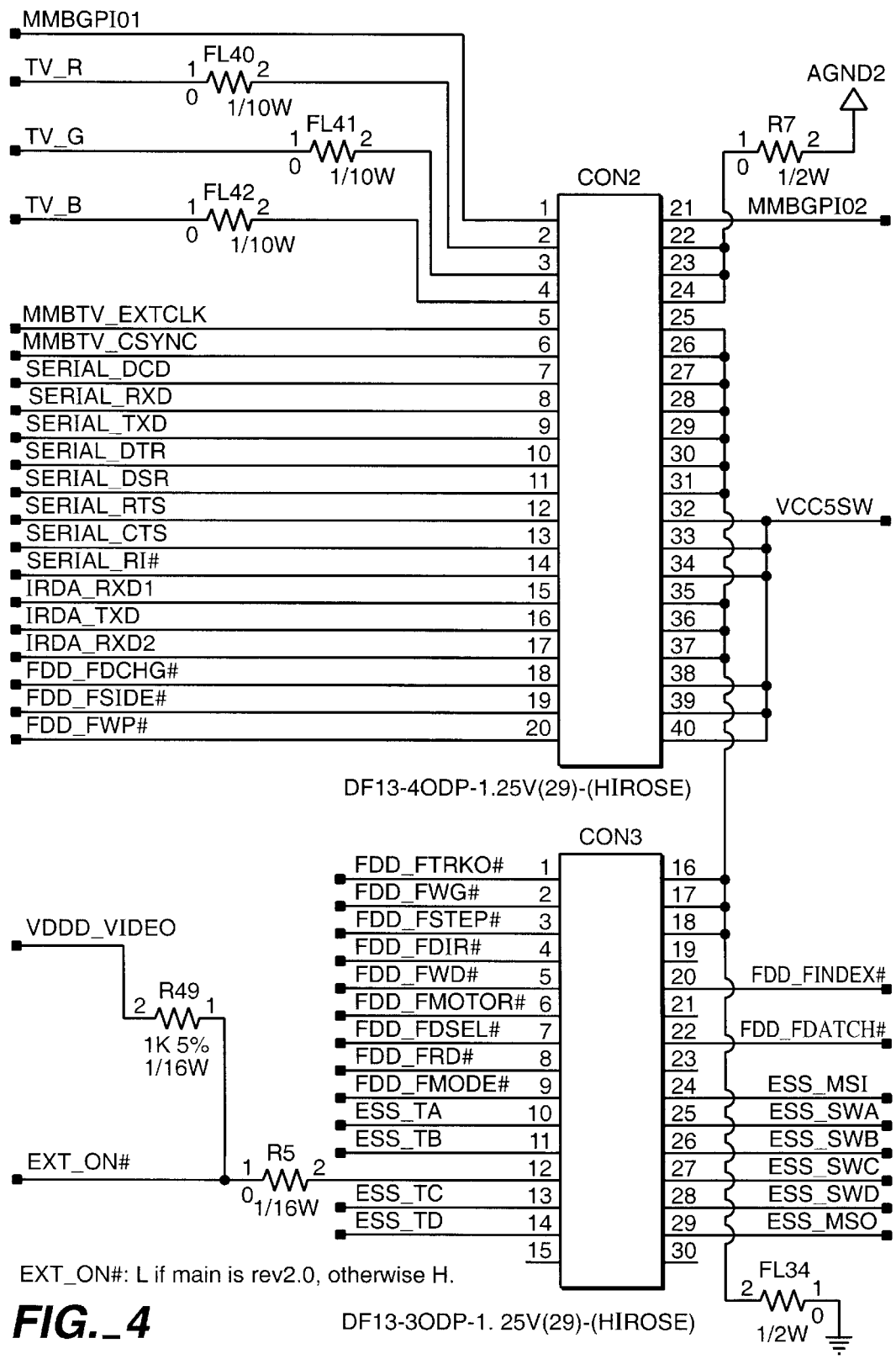
FIG._4

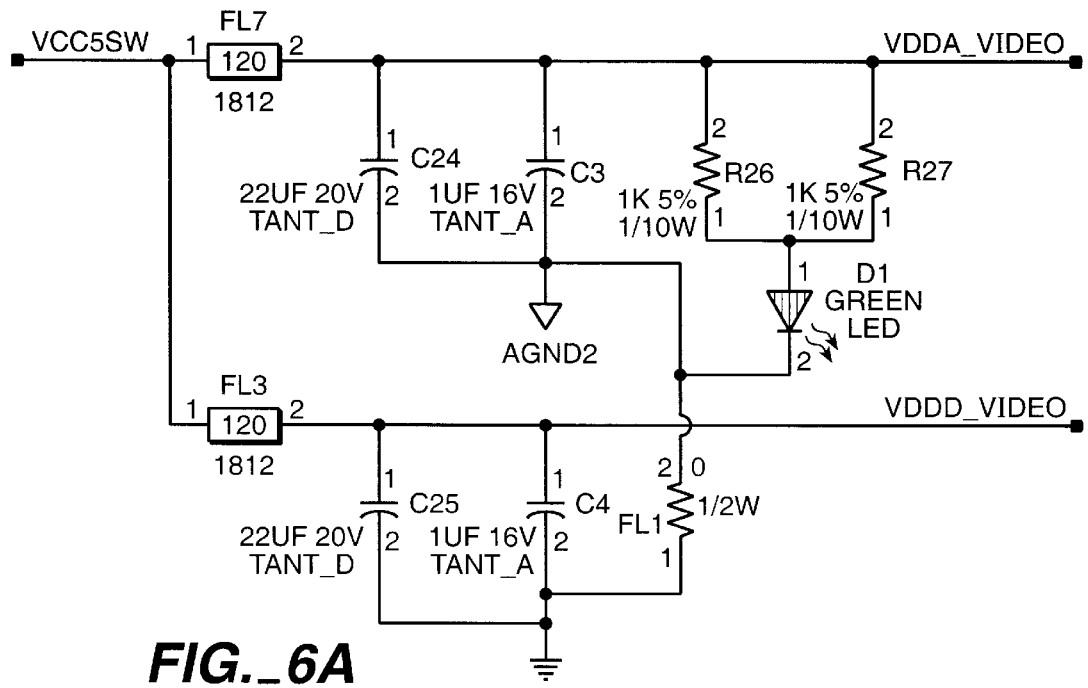
FIG._6A
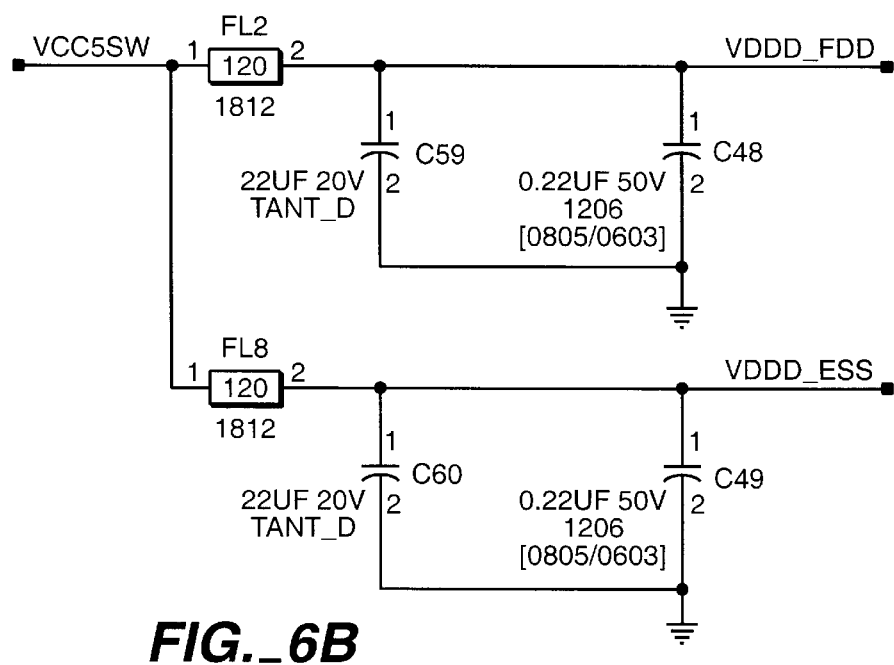
FIG._6B

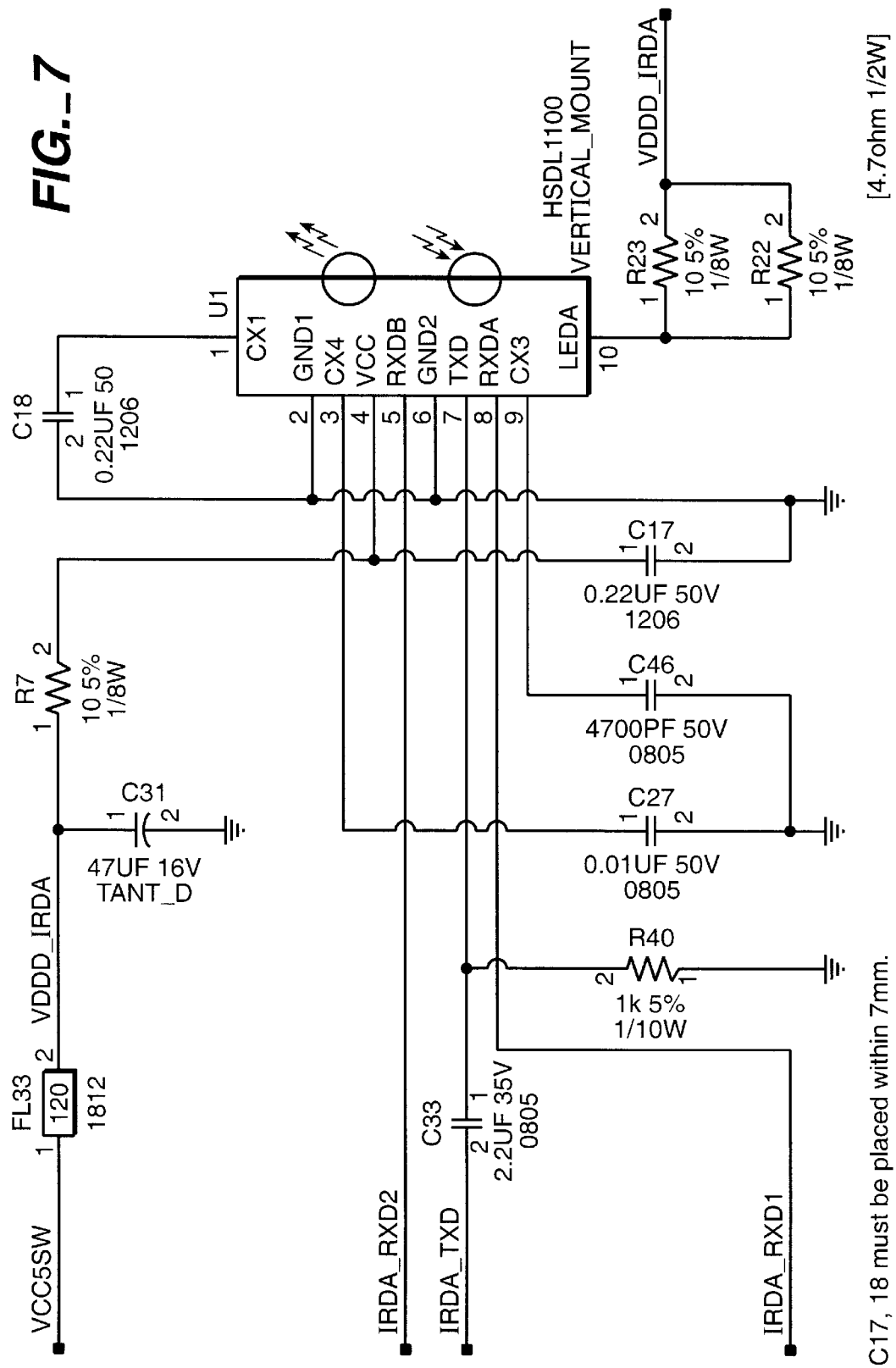
FIG._7

FIG._8
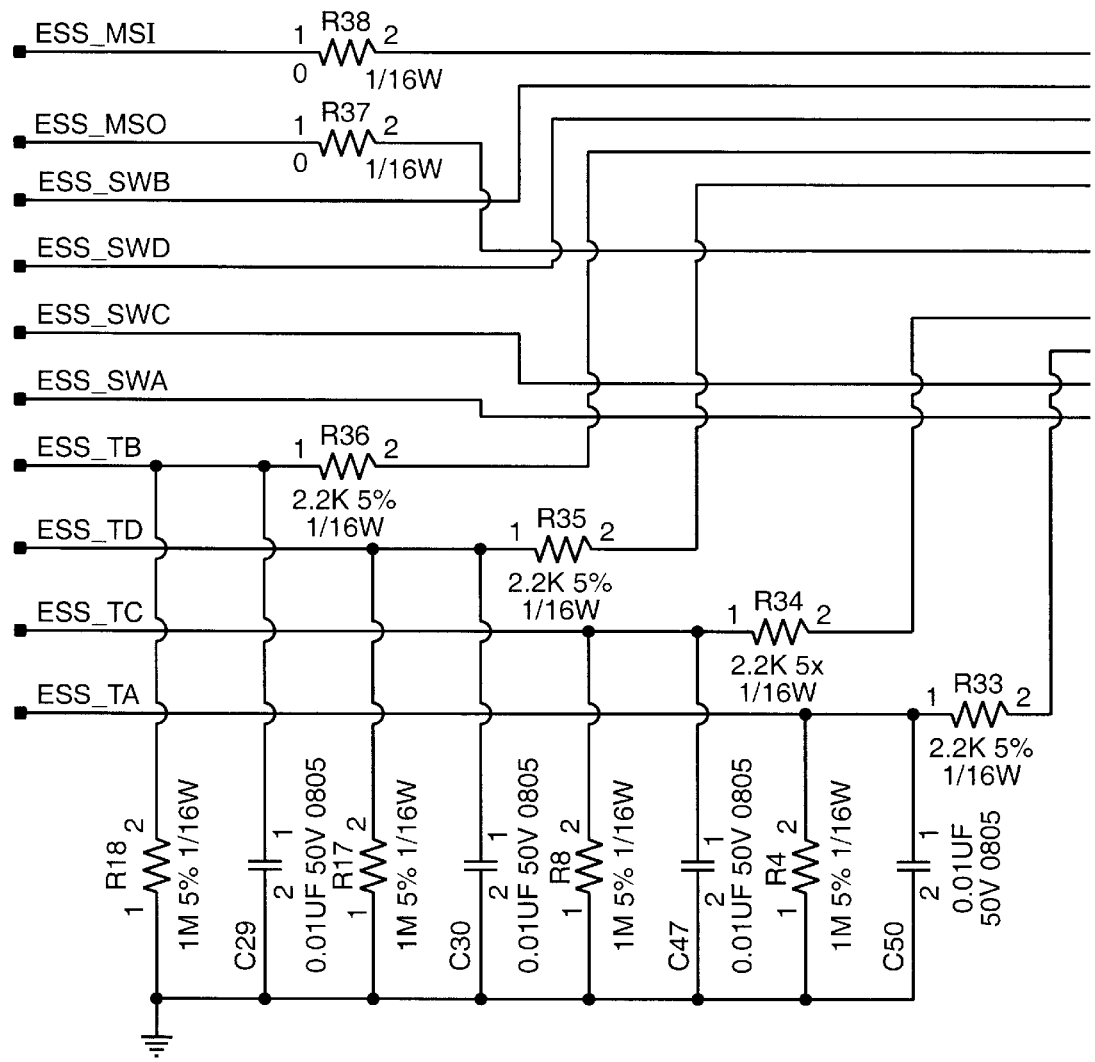
FIG._8A    Game Port & MIDI

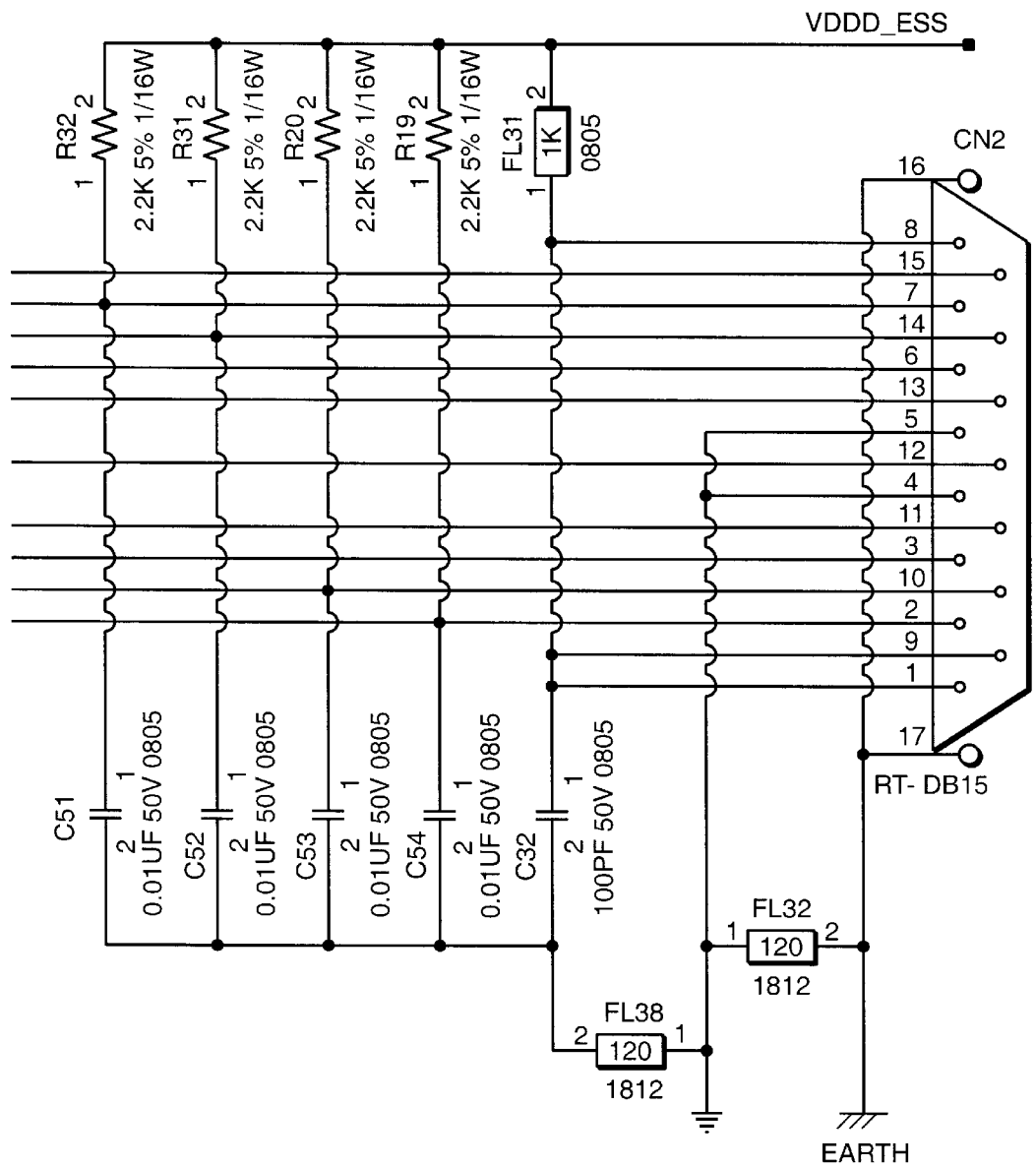
FIG._8B

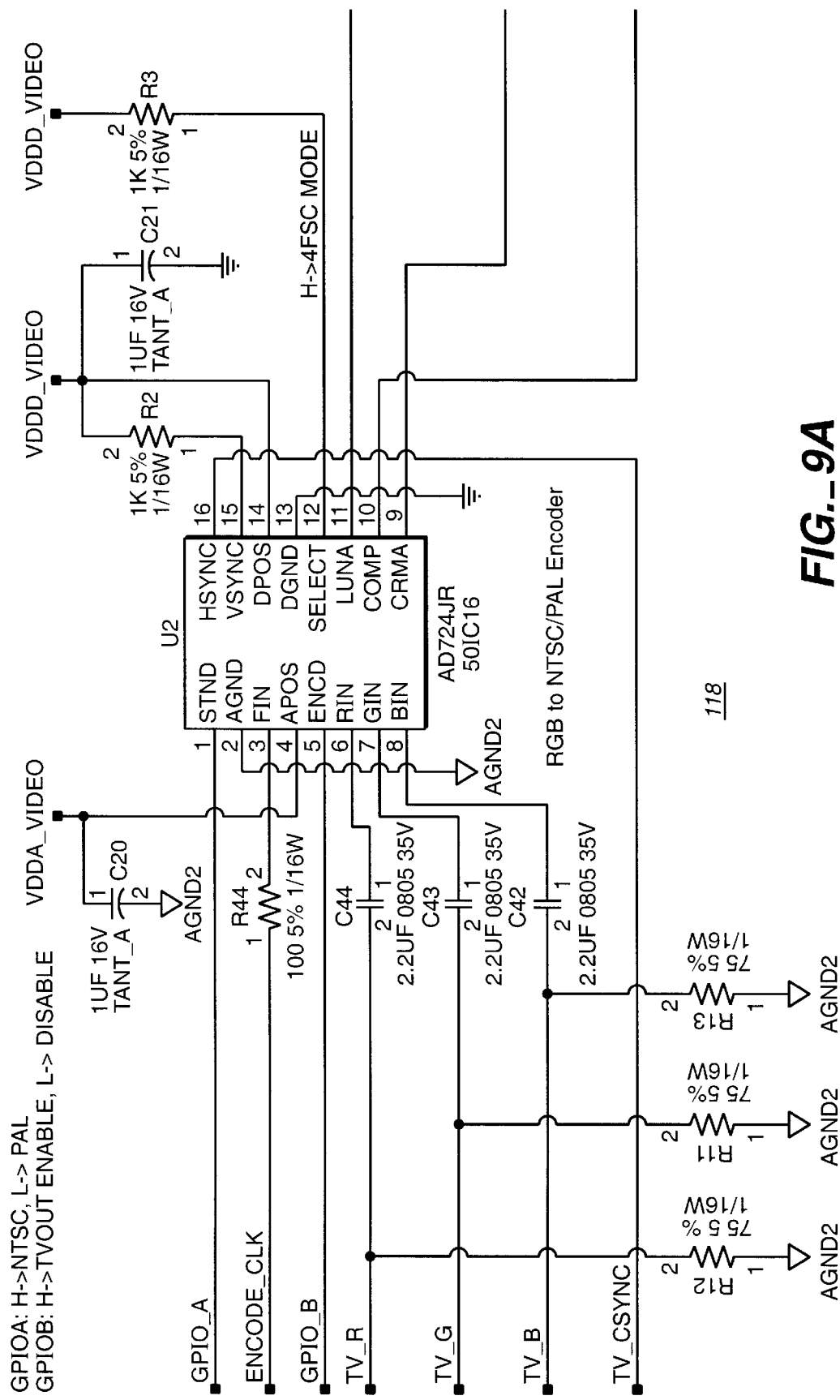
FIG._9A

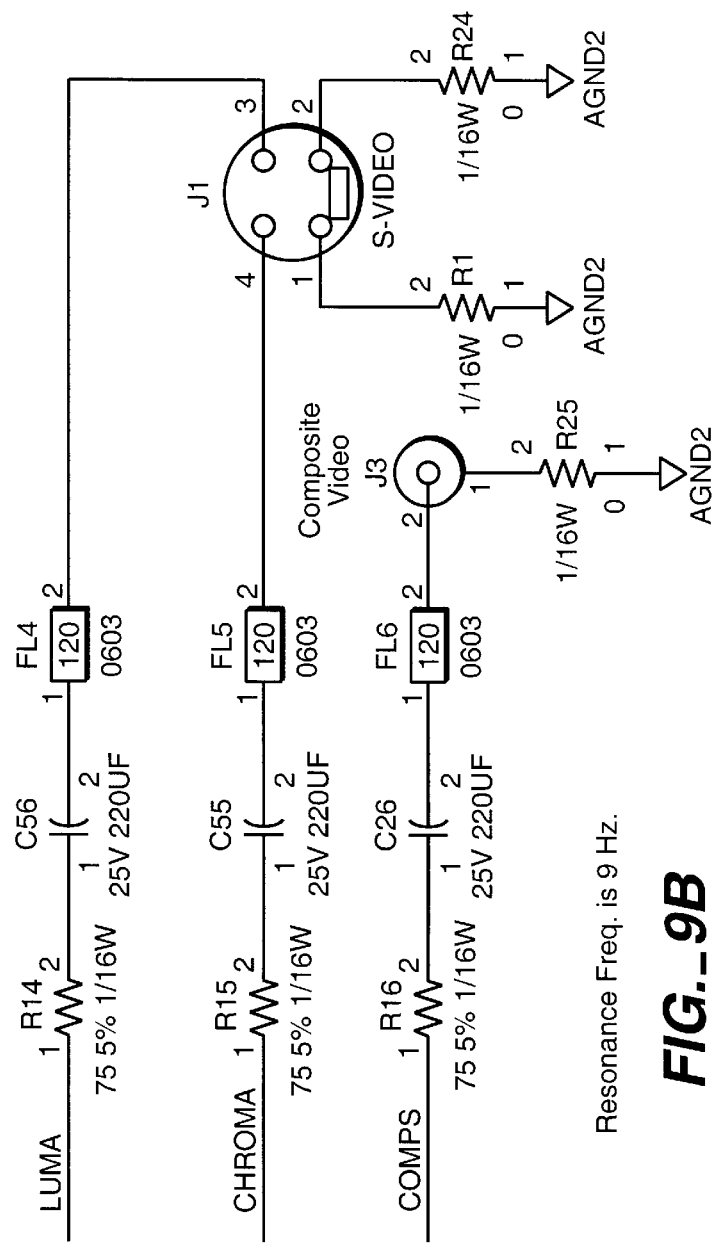
FIG._9B

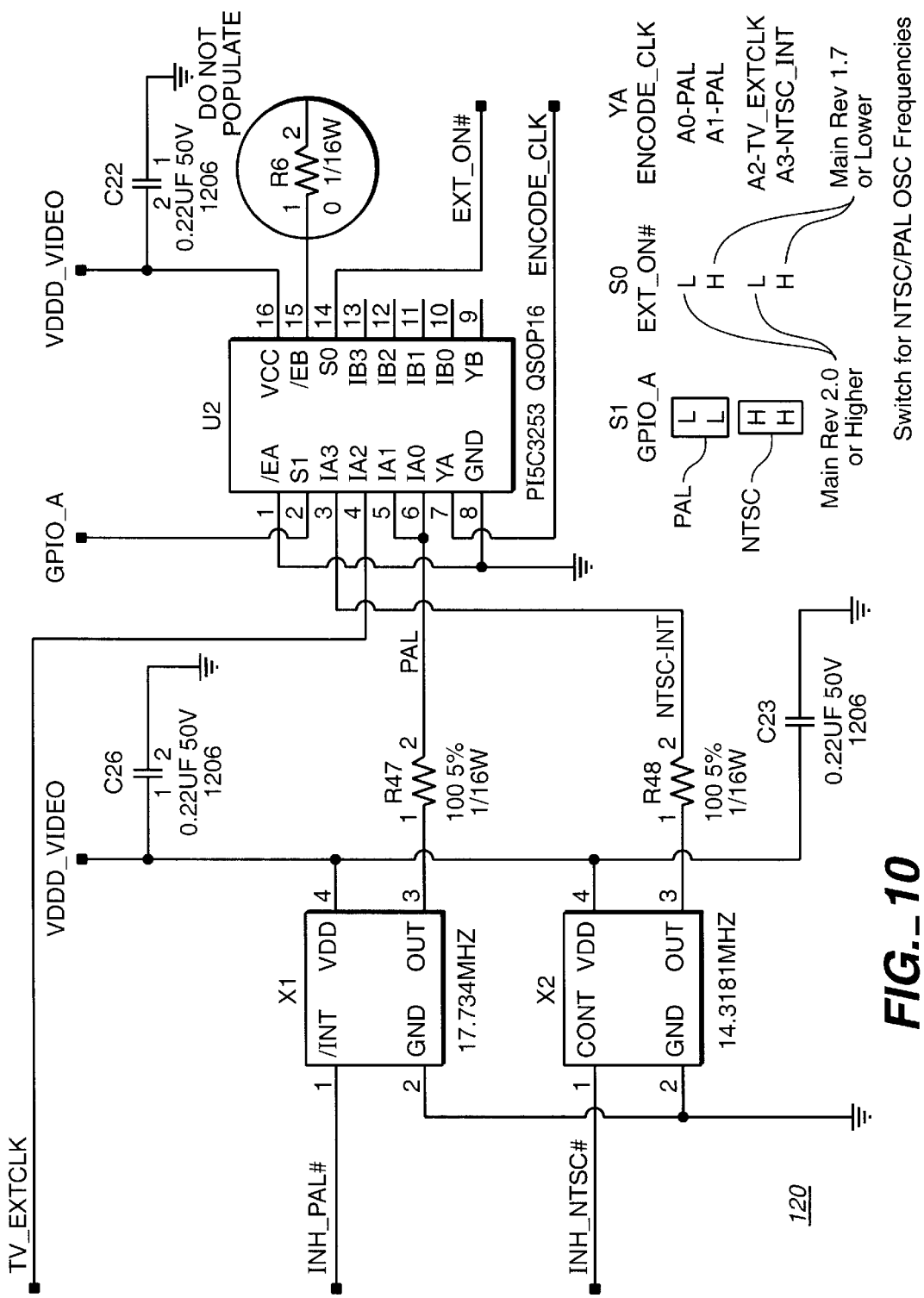
FIG._10

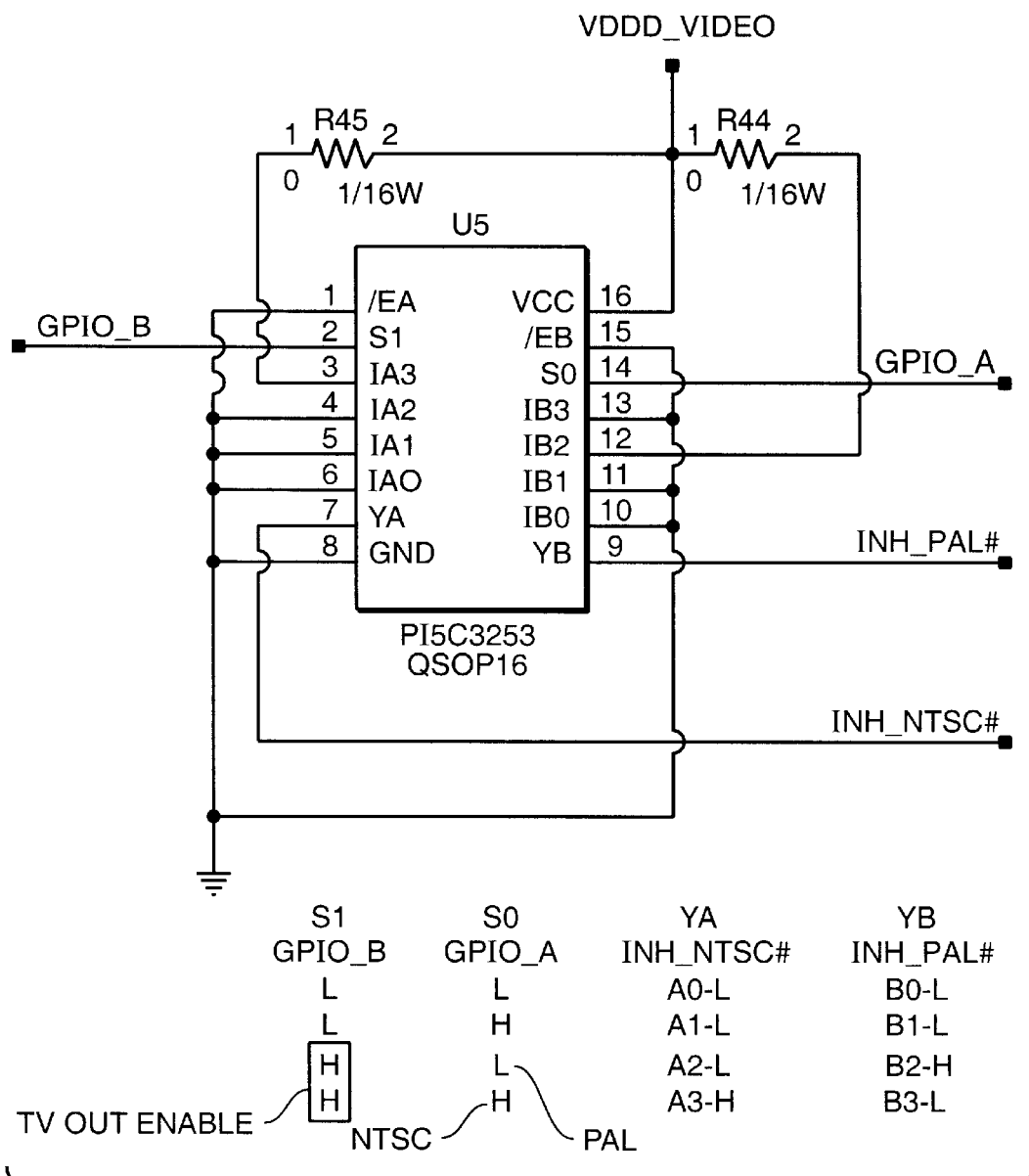
FIG._11

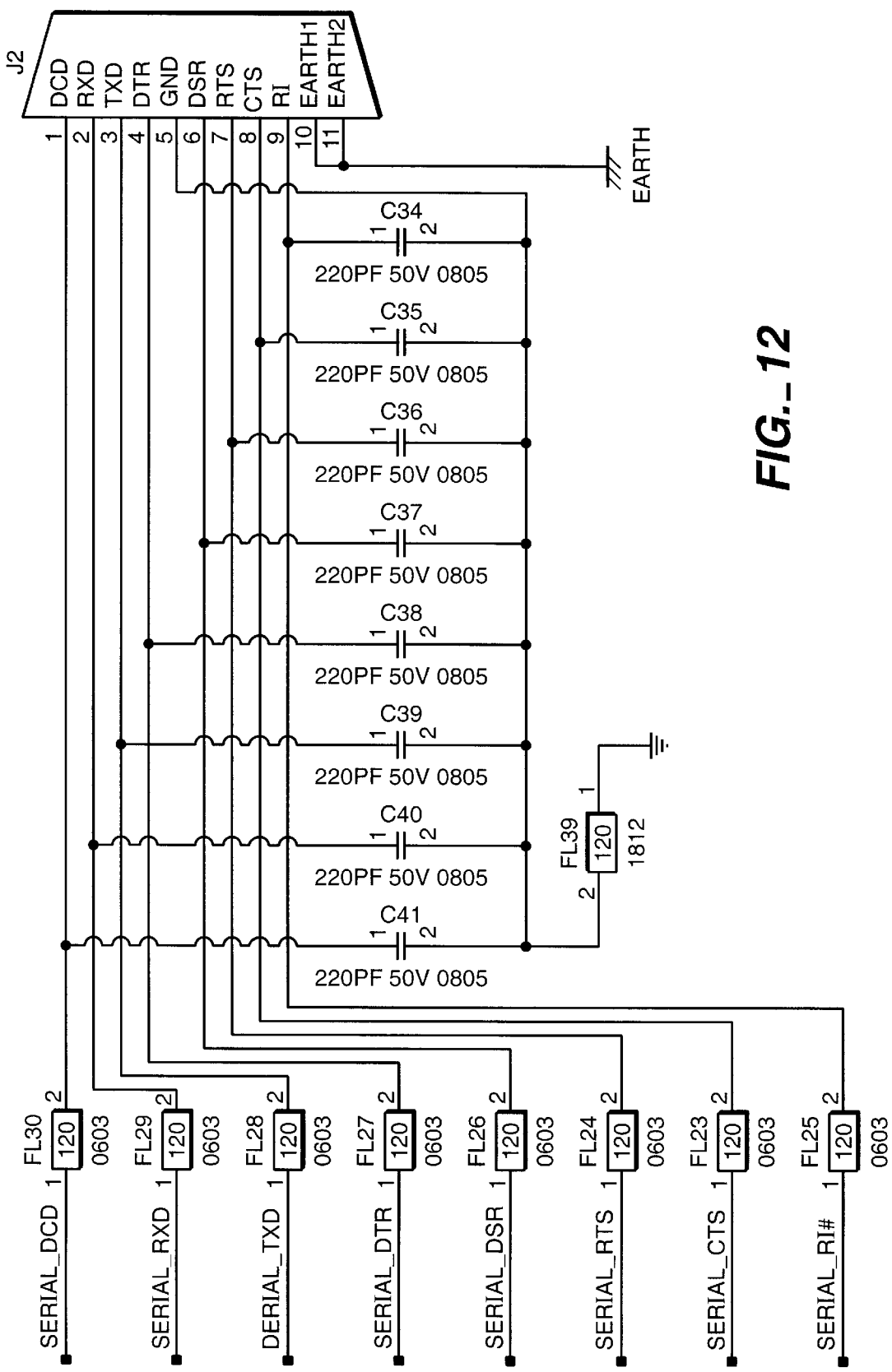
FIG._12

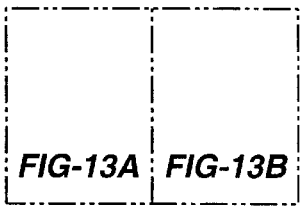
FIG._13
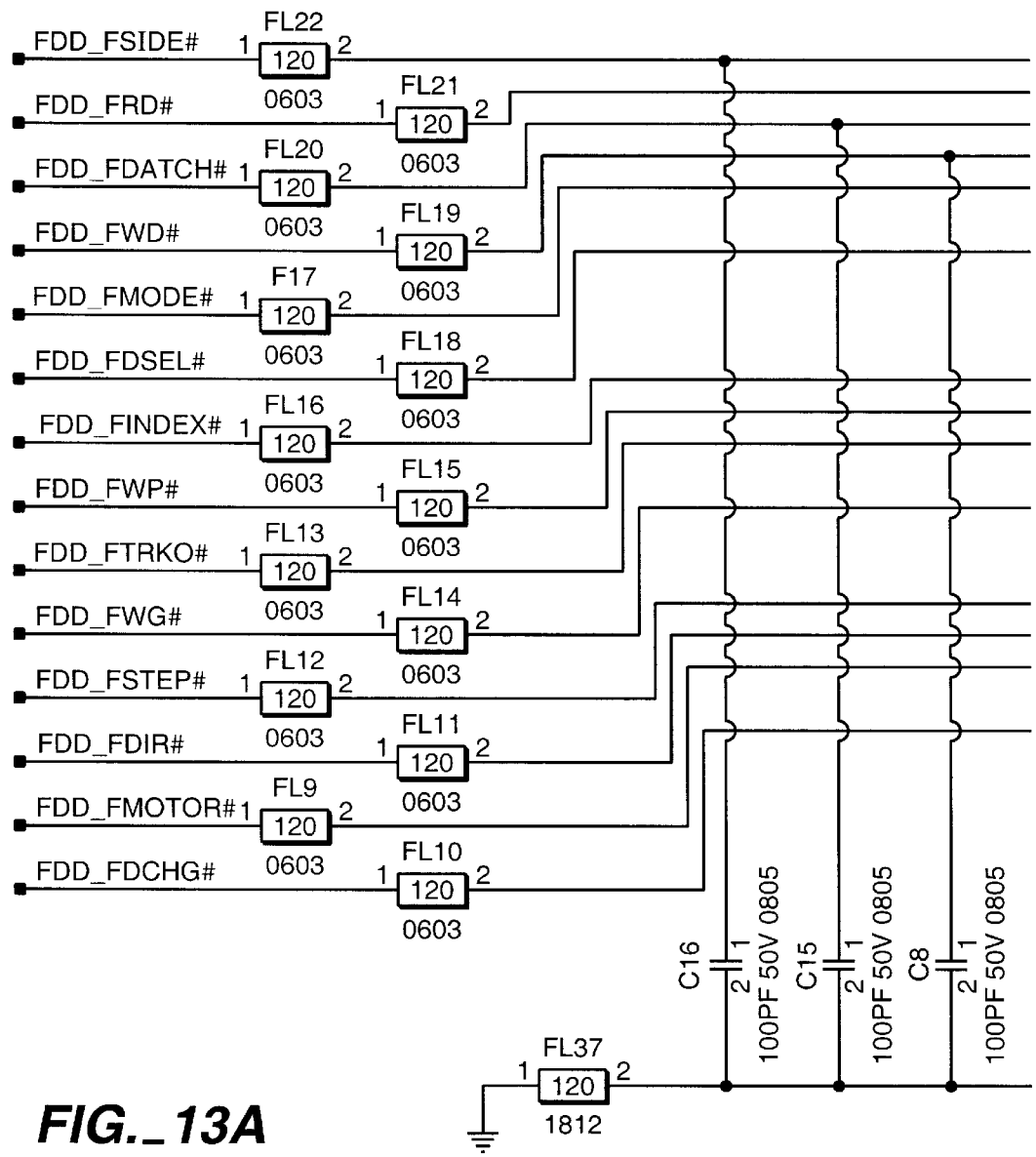
FIG._13A

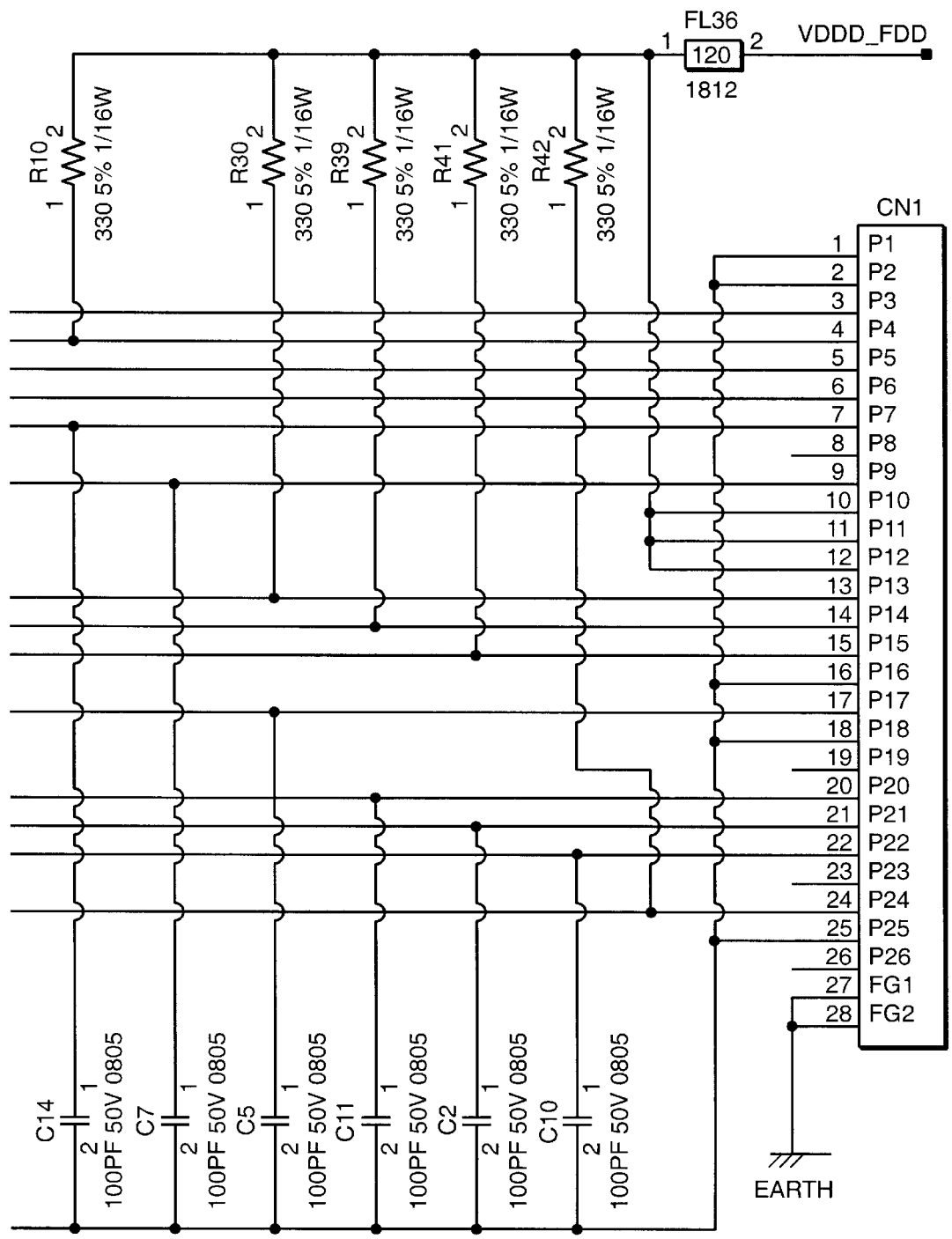
FIG._13B

MEDIA CONNECT MODULE FOR PORTABLE COMPUTER

BACKGROUND OF THE INVENTION

1. Field of the Invention

The present invention relates to notebook, laptop, and other portable computers, and more specifically, to a media connect module accessory for increasing the connectivity of such computers to peripheral devices.

2. Description of the Prior Art

Personal and notebook computers have become a ubiquitous tool for both personal and work related tasks. For a user, notebook, laptop, and portable computers offer the convenience and features of a larger computer in a compact package. Traditionally, printers, monitors, mice and other peripherals were connected to a computer through the use of individual connectors that permit communication between the computer and these devices by means of a copper wire cable. Most computing devices have utilized this method of connecting to peripheral devices for many years. In recent years, advances in technology as well as new standards and functions have brought about an increase in the type of connectors and peripheral devices that are desired by users to be connected to a computer. While the increase in available peripheral devices has provided new functions and added capabilities for the computer user, it has also produced a significant problem for notebook computer designers. This is because of the space constraint present in portable devices, i.e., the amount of space on the computer case which can be allotted to the variety of possible connectors. Thus, in many cases, a designer needs to trade off the number of possible or desired connectors with the space limitations of the computing unit. The designer is thus responsible for deciding on the number and type of connectors available to a user as part of the computer package. This decision is based on a variety of factors, including the intended use of the unit, space availability on the computer case, and market requirements, among others.

The variety of connectors available for a portable computer is as numerous as are the uses for the computer itself. There are "legacy" connectors that have been present since almost the beginning of personal computers and are still in use today, specialized connectors for multimedia functions, and audio connectors for audio equipment. These represent just a small subset of the type of connectors available for today's notebook computers. While connectors associated with particular types of peripheral devices have become de facto standards in most notebook computers, some of the newer and more specialized connectors are only available on certain notebooks and thus depend on the manufacturer's design choices. This has occurred because not all of the target users of a computer will desire all of the available connectors, so a manufacturer is forced to decide which set of connectors to incorporate into a computing device. However, the problem with this approach is that a user may find that in some situations they have a need for a connector not found in the existing connector selection, but are unable to expand the selection because the design does not have room for or otherwise permit connector expansion.

This problem has been addressed by specialized hardware for portable computers. Port replicators and docking stations are accessories available to a user to increase the connectivity options found on a portable computer. A port replicator is a device designed for desktop use which connects desktop peripherals, such as CRT monitors and printers, to a laptop computer. This is usually accomplished by connecting a port of the replicator directly to a connector on the backplane of the computer. The port replicator then provides a variety of I/O connections as an extension of the backplane connector. The primary benefit of a port replicator is that it eliminates the need to connect and disconnect each of the peripheral devices every time it is desired to use them with the laptop computer. Instead, the desired peripherals are connected to the replicator which then rests on a desktop where it may be more easily connected to the computer. However, traditional port replicators do not provide any new connection ports, but simply duplicate the ports and connectors already found on the computer. In addition, they are not designed to be portable and typically do not contain active circuitry for providing additional functionality. Furthermore, because the port replicator is connected directly to the backplane of the computer, it covers and renders inaccessible any existing connectors on the backplane. This can create a problem if a desired connector is found on the computer backplane but not on the port replicator.

A docking station is a "cradle" or holder in which a notebook computer is mounted to allow a user to "park" the computer and connect it to a source of power and connectors for various peripheral devices. As with port replicators, these devices do not increase the number of connectors available, but rather duplicate those found on the computer. In addition, the large size of docking cradles makes it cumbersome for a user to carry with them when traveling.

A significant difference between port replicators and docking stations is that a docking station typically includes a PCI (peripheral component interconnect) bus. This makes the docking station susceptible to what is termed the "hot docking" problem. This problem can arise when a peripheral device is connected to a portable computer while the computer is powered up. In such a situation it is desired to be able to connect the device to the computer without causing a temporary reduction in the power to the computer (thereby affecting the functioning of the computer, and in extreme cases, causing it to "crash"). In order to allow hot docking of the docking station to the computer, active circuits may be provided to prevent the PCI bus from failing and to provide high speed bus synchronization and expansion. The active circuits prevent the devices in the computer connected to the bus from becoming affected when the docking station is connected to the computer. Another possible solution to the hot docking problem is what is termed a "warm docking" approach in which the computer is placed into a suspended state (i.e., the power to the devices connected to the PCI bus is shut off) when the docking station is connected to the computer. This approach does not require the active circuits needed for hot docking, but does require specialized power management capabilities.

The widespread use of infrared communication ports (e.g., an "IrDA") to permit remote communication and data transfer between a peripheral device and a computer or between two computers has added an additional constraint to the design of notebook computers. This is because while such devices do not require a direct physical connection, proper data transmission requires that the infrared port in the computer be aligned with the infrared port in the device it is communicating with within a specified angle. In most cases, the data will not transmit completely or accurately if the ports are not in the proper relative position or if there are physical objects that block transmission of the infrared signals. This requirement is commonly termed as the "line of sight" requirement. Traditionally, the IrDA port has been integrated into the main body of the notebook computer, often on the backplane of the computer. However, this approach is disadvantageous and creates usability problems because of the line of sight requirement. This is because a user needs to physically rotate or move the notebook computer or the other device so that the line of sight requirement can be satisfied. This is inconvenient and in some situations, may not be feasible.

What is desired is an apparatus for enhancing the connectivity options of a notebook, laptop, or other portable computer so that a user can take advantage of the increase in the types of peripheral devices that can be connected to the computer. It is also desired to have a less cumbersome and restrictive means for satisfying the infrared port line of sight requirement than that presently available.

SUMMARY OF THE INVENTION

The present invention is directed to a module which may be connected to an I/O port of a notebook computer to enhance the number of connectivity options available to a user of the computer. The module houses a set of connectors, some or all of which may be specialized connectors not normally found on the computer. The connectors are electrically connected to an I/O port of the computer by a flexible cable that allows the module to be easily positioned or re-positioned by the user. The flexibility of the connection allows the user to easily satisfy the line of sight requirement when using the infrared port for data transmission. The inventive device combines the noted benefits with a small footprint and portability, and does not prevent access to the backplane of the notebook computer as can occur with port replicators and other such devices known in the art.

BRIEF DESCRIPTION OF THE DRAWINGS

FIG. 1 is a block diagram showing the primary functional components of the media connect module of the present invention.

FIG. 2 are top and side views showing the layout of the components of the media connect module of FIG. 1.

FIG. 3 is a schematic diagram of the components of the media connect module and an attached computer which enable the module to be "hot docked" to the computer without a reduction of power to the computer.

FIG. 4 is a schematic diagram of the connectors inside the media connect module which are used to interconnect the components of the module to a cable which is connected to the computer.

FIG. 5 is a schematic diagram of a power converter used to convert a 3.3 volt power supply from the computer to a 5 volt supply for operation of the television signal encoder contained in the media connect module.

FIGS. 6A and 6B are schematic diagrams of the power supply filtering components of the media connect module.

FIG. 7 is a schematic diagram of the infrared transmitter circuit of the media connect module.

FIG. 8 is a schematic diagram of the circuitry for the game port of the media connect module.

FIG. 9 is a schematic diagram of the television signal encoder circuit of the media connect module.

FIG. 10 is a schematic diagram of the clock signal generator circuit used to control the encoding of television signals by the encoder of FIG. 9.

FIG. 11 is a schematic diagram of the oscillator inhibit signal generator which is used to reduce the power consumption of the media connect module.

FIG. 12 is a schematic diagram of the serial port interface of the media connect module.

FIG. 13 is a schematic diagram of the external floppy disk interface of the media connect module.

DETAILED DESCRIPTION OF THE INVENTION

The present invention is directed to a module which may be connected by means of a flexible cable to a notebook computer I/O port to increase the type and number of connectors available to a user of the computer. The invention thus allows a user to increase the number and type of peripheral devices which may be connected to the computer. The module is a portable device that electrically connects several connectors designed to be used in conjunction with a notebook or other computer to the computer's I/O port. These connectors preferably include, but are not limited to, an IrDA port for transmission and reception of infra-red signals, and composite Video Out, S-Video Out, External Floppy, RS-232, and MIDI/Joystick connectors. The flexible cabling permits easy angular positioning of the module and allows the user to more easily meet the infrared port's line of sight requirement by separating the IR port from the body of the computer. Preferably, the length of the cable is selected so that it is long enough to permit a desired flexibility and mobility, but short enough to be conveniently carried.

FIG. 1 is a block diagram showing the primary functional components of the media connect module 100 of the present invention. As shown in the figure, module 100 is connected by a flexible cable 102 to a connector (not shown) which mates to an I/O port of the notebook computer. The other end of cable 102 is electrically connected to media connector interface 104 which distributes the signals between cable 102 and the signal buses connected to each of the ports of module 100. These ports include TV composite port 106, TV S-video port 108, RS232C port 110, IrDA (infra-red transmitter/detector) port 112, FDD (floppy disc) port 114, and GAME PORT 116. The signals provided to or from the RS232C, IrDA, FDD, and GAME ports are passed between media connector interface 104 and the respective ports without intervening active circuitry, i.e., with only passive filtering elements 117 (not shown in detail) being used to condition the signals.

The separate R(ed), G(reen), B(lue), H(orizontal), and V(ertical) signals provided by the computer to media connector interface 104 are provided to TV signal encoder 118 which is operated in response to a clock signal provided by clock generator 120. Encoder 118 converts the analog RGB signals presented at its input to the composite and S-video TV signal outputs. The S-video signal includes separated luma (intensity) and chroma (color) signals. The composite signal is formed from a combination of the luma and chroma signals. Media connect Module 100 also includes LED indicator light 122 which indicates when module 100 is powered by being properly connected to the notebook or other portable computer.

The connectors contained in module 100 are mounted on a printed circuit board (PCBA) that is housed in a coated sheet metal chassis and fastened together with machine screws. Flexible electrical cable 102 is fitted with a 68-pin connector (not shown) to provide connection to the notebook computer. The cable's 68-pin connector is connected to a mating 68-pin connector located on the side of the notebook computer. However, the connection to the notebook computer is not limited to this particular method. It is possible to use other connections such as PCMCIA or Cardbus slots on the computer to pass the needed signals between the computer and the module. A cable connector having a fewer number of pins may be used in circumstances in which circuitry requiring additional pins, e.g., a TV signal encoder, is not present in the media connect module. Media connect module 100 has "feet" or pads formed from rubber or a similar non-skid material on the bottom of the module to prevent its movement after it has been oriented in a desired position and placed on a surface.

FIG. 2 are top and side views showing the layout of the components of the media connect module of FIG. 1. As shown in the figure, filter capacitors (labeled "Cap" in the figure) are utilized to filter the signals passing between the peripheral(s) and the computing device through the media connect module. The components were laid out in accordance with standard engineering considerations taken into account when designing printed circuit boards (e.g., board size, impedance matching criteria, use of capacitors for reduction of electromagnetic interference).

FIG. 3 is a schematic diagram of the components of the media connect module 100 and an attached computer 101 (labeled "Main Unit" in the figure) which enable the module to be "hot docked" to the computer while it is powered up without a reduction in power to the computer which might cause the computer to become inoperative (e.g., to "crash"). With regards to the computing unit 101, DC power supply circuit 200 supplies DC power to the other components of computer through controller circuit 202. Power supply circuit 200 also provides power to media connect module 100 when it is electrically connected to the computing device. Module 100 and computing device 101 are connected by mating connectors connected to nodes 201 and 203. Inductor L1 204 and capacitor C1 206 are components added to the power control circuitry of computing device 101 to enable "hot docking" of module 100 into device 101. Filter FL2 208 and capacitor C2 210 are power control components used in the DC power line in module 100. Circuit 212 is a power controller contained in module 100. In addition to the connection at nodes 201 and 203, media connect module 100 and computing device 101 may be connected together by ground and I/F signal lines.

V(t) is the voltage at the connector site (the voltage at nodes 203 of the computing device). When the media connect module and computing device are connected, the electrical charge present on capacitor C1 flows to filter FL2, quickly charging capacitor C2. This causes the voltage V(t) to drop. If the amount of voltage drop is sufficiently large, controller circuit 202 may not function correctly. This can cause computing device 101 to "crash" or shut down. Inductor L1 and the capacitor C1 are introduced to prevent this problem. C1 should be larger than C2, and inductor L1 should be chosen to be large enough to prevent electrical charge from flowing too quickly into C2 (note that the rate of voltage drop is a function of the value of the inductor). This is because if the voltage drop exceeds a prescribed level, then the devices connected to the power could be reset or have register values altered. Thus, the level to which V(t) drops before resuming its normal operating value is critical. If V(t) drops below the threshold power supply level required by the controller or other circuits in the computer, the circuits can become unstable. Inductor L1 is thus used to prevent V(t) from dropping below this threshold level.

FIG. 4 is a schematic diagram of the connectors inside the media connect module which are used to interconnect the components of the module to the cable which is connected to the computing device. The connectors correspond to Media Connect Interface 104 of FIG. 1. As shown in the figure, two connectors (labeled "CON2" and "CON3") are used. Two connectors are used to reduce the cost of the component, however, a single, or multiple connectors may of course be used.

FIG. 5 is a schematic diagram of power converter 220, which is used to convert a 3.3 volt power supply from the computing device (labeled "Low 3.3V Input" in the figure) to a 5 volt supply (labeled "5V CMOS Output" in the figure) for operation of the television signal encoder contained in media connect module 100. As shown in the figure, the input signals (which include clock "EXTCLK" and synchronization "CSYNC" signals) from the computing device are provided to converter 220. The outputs of converter 220 are provided as inputs to encoder 118 of FIGS. 1 and 9. Note that if the television encoder circuit is capable of operating at the same voltage as the power supply of the computing device, then the converter circuit of FIG. 5 may not be required.

As noted, "TV_CSYNC" is the H-V (horizontal-vertical) composite synchronization signal. Signal "TV_EXTCLK" is an encoding clock signal to encode the RGB signals to the composite and S-video signals. Note that the invention incorporates a redundant encoding clock signal as a means of balancing the signal quality versus electromagnetic interference issues.

FIGS. 6A and 6B are schematic diagrams of the power supply filtering components of the media connect module. Filters FL2, FL3, FL7, and FL8 are used to remove noise on the DC power line. Capacitors C24, C25, C59, and C60 are also used to remove noise on the line. These filter components are used to smooth the power provided by the computing device and supply a stable power supply for the operation of the media connect module. Light emitting diode D1 is used to indicate when the media connect module is properly connected to the computer and receiving power.

FIG. 7 is a schematic diagram of the infrared transmitter/receiver circuit of the media connect module. This circuit is used to enable infrared signals to be communicated between the media connect module (and hence the computing device to which it is attached) and a remote controller or peripheral device. The transmitter/receiver is placed in the module to take advantage of the additional degrees of freedom in placement and orientation of the transmitter/receiver permitted by the module. Separation of the transmitter/receiver from the body of the computer also reduces electrical interference between the transmitter/receiver and the other components of the computer. In the figure, signal "IRDA_TXD" is the signal to be transmitted. Signals "IRDA_RXD1" and "IRDA_RXD2" are received signals. Chip U1 transduces electrical signals to infrared for transmission and received infrared signals to electrical signals for further processing.

Note that although the IrDA infrared protocol has been referred to, the invention may be used with other infrared protocols. These include Sharp-IR, IrDA 1.0 SIR, IrDA 1.1 MIR and FIR, and Consumer Electronics IR (also referred to as TV remote or Consumer Remote Control). Furthermore, in addition to infrared protocols, other forms of wireless communication may be used to enable communication between the media connect module and a remote controller or peripheral device.

FIG. 8 is a schematic diagram of the circuitry and connections for the game port of the media connect module. Note that the signals labeled "ESS_**" are connected to connector CN2 of the figure.

FIG. 9 is a schematic diagram of the television signal encoder circuit of the media connect module. As previously discussed, encoder 118 converts analog R, G, and B signals provided by the computing device to NTSC or PAL composite or S-video signals available though the indicated composite or S-video connectors.

FIG. 10 is a schematic diagram of clock signal generator circuit 120 used to control the encoding of television signals by the encoder of FIG. 9. The clock signal used to control the encoding process is selected from oscillator X1 or X2, or the clock signal provided by the computing device. The GPIO_A and EXT_ON# control signals shown in the figure are used to select the desired clock signal source. The PAL clock frequency is 17.734 MHz, while the NTSC clock frequency is 14.318 MHz. The NTSC clock signal is provided from either oscillator X2 or the main unit.

FIG. 11 is a schematic diagram of the oscillator inhibit signal generator which is used to reduce the power consumption of the media connect module. Integrated circuit chip U5 generates an inhibit signal for the crystal oscillators in oscillators X1 and X2. This is done to prevent the generation of a clock signal when the clock is not needed for the encoding process, thereby reducing the power consumption of the media connect module.

FIG. 12 is a schematic diagram of the serial port interface of the media connect module. Note that each of the signals shown ("SERIAL_***") are connected to connector J2. Filters FL23 to FL30 and capacitors C34 to C41 are used to reduce electromagnetic interference.

FIG. 13 is a schematic diagram of the external floppy disk interface of the media connect module. Filters FL9 to FL22 and the capacitors shown are for the purpose of reducing electromagnetic interference. The resistors shown are for "pull up" of the signals.

The media connect module of the present invention can be differentiated from a port replicator or docking station in at least the following ways:

(1) Port replicators and docking stations are designed for desktop use and not for mobile use. Currently all port replicators are desk-bound and none are portable. The media connect module of the present invention is a compact and portable device designed for frequent connecting and disconnecting, because it is specifically designed for mobile use. In order to achieve high portability, the module has a small form factor (101 mm by 60 mm by 25 mm) and weight. The module also has a small footprint to conserve space on a desktop or other surface on which the notebook computer is resting;

(2) Traditional port replicators and docking stations duplicate the ports and connectors available on the computing device, whereas the inventive module provides a set of connectors that are not found on the computing device. Therefore, the module is not a port replicator, but instead provides port enhancement. This is a significant difference since the module provides a means of enlarging the I/O ports and connectors available, rather than merely duplicating them, and does so without preventing access to existing connection ports on the computing device. In addition, and in contrast to prior art port replicators, the inventive module does not prevent access to the backplane of the computer (and hence the connectors positioned there); and (3) The module allows easy adjustment of IrDA signal direction. Active infrared signals are line-of-sight optical signals that transmit and receive information within a +/−15 degree "cone" or envelope in space. Because of this geometric limitation, the transmitter and receiver must be aligned within a defined envelope for proper data transfer. For notebook or computing devices with an IrDA built into the unit, the user must physically move the computer to satisfy the alignment requirement. However, through the use of a flexible cable, the media connect module provides a more convenient alignment method by allowing the user to easily move or rotate the module while the computing device remains stationary. In addition, by locating the IR transmitter/receiver circuitry in the module, interference and cross-talk between that and other circuitry in the computer is reduced.

It is noted that the optimal length of cable 102 is determined by considering several factors. It is desirable that the cable be long enough to permit sufficient movement of the module during the process of aligning the IrDA port to a remote control or peripheral. However, the combined propagation length of the cable and any signal paths inside the module and computing device should not exceed the capacity of the buffers in the computer and module to drive the signals so that they have sufficient strength for operation of the computer and peripherals. In addition, it is desirable to keep the cable length as short as possible to enhance convenient portability of the device. In this regard, the inventors have determined that the maximum desired cable length is approximately 18 inches, and preferably, the cable length is nine inches or less.

As noted, the minimum cable length is primarily a function of the need to be able to move the module throughout a desired range of motion to permit alignment of the IR port with another device. The minimum length is also affected by a desire to make the media connect module a compact, easily transportable package. In this regard it is desirable that the cable and attached multi-pin connector be capable of being folded flat against the case of the module. This permits easy insertion of the module and cable into a shirt pocket or small case. Using these criteria, the minimal desired cable length has been found to be approximately 4 inches.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A media connect module for electrically connecting a plurality of peripheral devices to a computing device, comprising:

a computing device connector capable of being electrically connected to a port of the computing device;

a plurality of connectors for peripheral devices including at least one connector which is not available on said computing device;

a flexible cable electrically connecting the computing device connector to the plurality of connectors and of such length and flexibility as to allow positioning of the media connect module to provide a line of sight for wireless communication between the computing device and a second wireless device positioned in front of the computing device; and a wireless transmitter and receiver circuit electrically connected to the computing device connector.

2. The media connect module of claim 1, wherein the plurality of connectors for peripheral devices includes a television signal connector.

3. The media connect module of claim 2, wherein the television signal connector is a composite television signal connector.

4. The media connect module of claim 2, wherein the television signal connector is an S-video television signal connector.

5. The media connect module of claim 1, wherein the plurality of connectors for peripheral devices includes a floppy disk connector.

6. The media connect module of claim 1, wherein the plurality of connectors for peripheral devices includes a game port.

7. The media connect module of claim 1, wherein the plurality of connectors for peripheral devices includes a serial port connector.

8. The media connect module of claim 1, wherein the flexible cable has a length between about 4 and 18 inches.

9. The media connect module of claim 1, wherein the flexible cable has a length between about 4 and 6 inches.

10. The media connect module of claim 1, wherein the computing device connector is capable of being electrically connected to an input/output (I/O) port of the computing device.

11. The media connect module of claim 2, further comprising:
a television signal encoder electrically connected between the computing device connector and the television signal connector.

12. The media connect module of claim 11, further comprising:
a clock signal generator for providing a clock signal to operate the television signal encoder.

13. The media connect module of claim 1, further comprising:
a hot dock circuit which permits the media connect module to be electrically connected to the computing device without causing a circuit in the computing device to become inoperative.

14. The media connect module of claim 1, wherein the wireless transmitter and receiver circuit is an infrared transmitter and receiver circuit.

15. A computing system, comprising:
a computing device having a case on which are mounted a first set of peripheral connectors electrically connected to other components of the computing device;
an input/output port mounted on the computing device; and
a flexible cable electrically connected at a first end to the data input/output port and at a second end to a media connect module such that the peripheral connectors on said computing device are accessible, wherein the media connect module further comprises:
a second set of peripheral connectors
electrically connected to the flexible cable,
the second set connectors having at least one connector not in common with the first set of peripheral connectors.

16. The computing system of claim 15, wherein the media connect module further comprises:
a wireless transmitter and receiver device.

17. A computing system of claim 15, wherein the second set of peripheral connectors includes a plurality of television signal connectors.

18. The computing system of claim 17, wherein the plurality of television signal connectors includes a composite television signal connector.

19. The computing system of claim 17, wherein the plurality of television signal connectors includes an S-video television signal connector.

20. The computing system of claim 15, wherein the second set of connectors for peripheral devices includes a floppy disk connector.

21. The computing system of claim 15, wherein the second set of connectors for peripheral devices includes a serial port connector.

22. The computing system of claim 15, wherein the second set of connectors for peripheral devices includes a game port.

23. The computing system of claim 16, wherein the flexible cable has a length between about 4 and 18 inches.

24. The computing system of claim 16, wherein the flexible cable has a length between about 4 and 6 inches.

25. The computing system of claim 17, wherein the media connect module further comprises:
a television signal encoder electrically connected between the computing device and the television signal connector.

26. The computing system of claim 25, wherein the media connect module further comprises:
a clock signal generator for providing a clock signal to operate the television signal encoder.

27. The computing system of claim 16, wherein the wireless transmitter and receiver device is an infrared transmitter and receiver device.

28. The computing system of claim 15, wherein the media connect module further comprises:
a hot dock circuit which permits the media connect module to be electrically connected to the computing device without causing a reduction in power to the computing device which might cause the computing device to become inoperative.

29. A media connect module for electrically connecting a plurality of peripheral devices to a computing device, comprising:
a computing device connector capable of being electrically connected to a port of the computing device;
a plurality of connectors for peripheral devices;
a flexible cable having a length in the range of about 4 to 18 inches and electrically connecting the computing device connector to the plurality of connectors; and
a wireless transmitter and receiver circuit electrically connected to the computing device connector.

30. The media connect module of claim 29, wherein the plurality of connectors includes a plurality of television signal connectors.

31. The media connect module of claim 30, wherein the plurality of television signal connectors includes a composite television signal connector.

32. The media connect module of claim 30, wherein the plurality of television signal connectors includes an S-video television signal connector.

33. The media connect module of claim 30, wherein the plurality of connectors for peripheral devices includes a floppy disk connector.

34. The media connect module of claim 33, wherein the plurality of connectors for peripheral devices includes a game port.

35. The media connect module of claim 34, wherein the plurality of connectors for peripheral devices includes a serial port connector.

36. The media connect module of claim 29, wherein the flexible cable has a length between about 4 and 6 inches.

37. The media connect module of claim 29, wherein the computing device connector is capable of being electrically connected to an I/O port of the computing device.

38. The media connect module of claim 29, wherein the wireless transmitter and receiver circuit is an infrared transmitter and receiver circuit.

39. The media connect module of claim 30, further comprising:
    a television signal encoder electrically connected between the computing device connector and the television signal connector.

40. The media connect module of claim 39, further comprising:
    a clock signal generator for providing a clock signal to operate the television signal encoder.

41. The media connect module of claim 40, further comprising:
    a hot dock circuit which permits the media connect module to be electrically connected to the computing device without causing a reduction in power to the computing device which might cause the computing device to become inoperative.

* * * * *